United States Patent [19]
Wood et al.

[11] Patent Number: 5,610,267
[45] Date of Patent: *Mar. 11, 1997

[54] PROCESS FOR PREPARING POLYSUCCINIMIDE BY HIGH TEMPERATURE REACTION

[75] Inventors: Louis L. Wood, Rockville; Gary J. Calton, Elkridge, both of Md.

[73] Assignee: Bayer AG, Leverkusen, Germany

[ * ] Notice: The term of this patent shall not extend beyond the expiration date of Pat. No. 5,288,783.

[21] Appl. No.: 357,444

[22] Filed: Dec. 16, 1994

Related U.S. Application Data

[63] Continuation-in-part of Ser. No. 118,589, Sep. 10, 1993, abandoned, which is a continuation-in-part of Ser. No. 7,376, Jan. 21, 1993, Pat. No. 5,288,783, which is a continuation-in-part of Ser. No. 882,919, May 14, 1992, abandoned.

[51] Int. Cl.$^6$ .......................... C08G 63/44; C08G 67/02
[52] U.S. Cl. .................. 528/363; 525/418; 525/419; 525/420; 525/539; 528/392
[58] Field of Search ................................ 525/418, 419, 525/420, 539; 528/363, 392

[56] References Cited

U.S. PATENT DOCUMENTS

| | | |
|---|---|---|
| 2,306,918 | 12/1942 | Weiss et al. . |
| 3,052,655 | 9/1962 | Fox et al. ............................. 525/328.2 |
| 3,846,380 | 11/1974 | Fujimoto et al. ..................... 525/328.2 |
| 4,169,924 | 10/1979 | Barabas et al. ......................... 525/377 |
| 4,590,260 | 5/1986 | Harada et al. ........................... 528/363 |
| 4,696,981 | 9/1987 | Harada et al. ........................... 525/328 |
| 4,839,461 | 6/1989 | Boehmke ................................ 528/363 |

(List continued on next page.)

FOREIGN PATENT DOCUMENTS

| | | |
|---|---|---|
| 256366 | 2/1988 | European Pat. Off. . |
| 561452 | 9/1993 | European Pat. Off. . |
| 578448 | 1/1994 | European Pat. Off. . |
| 578450 | 1/1994 | European Pat. Off. . |
| 592265 | 4/1994 | European Pat. Off. . |
| 593187 | 4/1994 | European Pat. Off. . |
| 608160 | 7/1994 | European Pat. Off. . |
| 1404814 | 9/1975 | United Kingdom . |
| 2246786 | 2/1992 | United Kingdom . |
| WO92/14753 | 9/1992 | WIPO . |
| WO93/23452 | 11/1993 | WIPO . |
| WO94/14939 | 7/1994 | WIPO . |

OTHER PUBLICATIONS

Harada, Polycondensation of Thermal Precursors of Aspartic Acid, Journal of Org. Chem., vol. 24 pp. 1662–1666 (1959).

Chemical Abstracts, vol. 111, No. 6, 7 Aug. 1989, Columbus, Ohio, US; abstract No. 40111d, *Zusammenfassung* & JP–A–63 270 735 (KOEI CHEMICAL) 8 Nov. 1988.

Dessaignes, Quarterly Journal of the Chemical Society of London, vol. III, reprinted 1950. Translation of Comp. Rend. XXX, 324.

Kovacs et al., *Chemical Studies of Polyaspartic Acids*, Journal of Organic Chemistry, vol 26, pp. 1084–1091 (1960).

Sarig et al., *The Use of Polymers for Retardation of Scale Formation*, Natl. Counc. Res. Dev., [Rep.] NCRD (Isr.) pp. 150–157 (1977).

Dessaignes, Chimie Organique, *Nouvelles recherches sur la production de l'acide succinique au moyen de la fermentation*; C.R. 31. pp. 432–433, (1850) (Original French language version–translation at AM).

Patent Abstracts of Japan, vol. 010, No. 056 (C–331) 6 Mar. 1986 & JP–A–60 197 646 (Nippon Shokubai Kagaku Kogyo KK) 7 Oct. 1985 *abstract*.

Primary Examiner—Terressa Mosley
Attorney, Agent, or Firm—Connolly & Hutz

[57] ABSTRACT

Polyaspartate, useful for inhibition of incrustations due to materials causing hardness in water and of value in detergent formulations, can be prepared by reacting malic acid, maleic acid or fumaric acid with ammonia, in a molar ratio of 1:1–2.1 at temperatures greater than 140° C., followed by conversion of the polysuccinimide formed in this reaction to a salt of polyaspartic acid by basic hydrolysis.

20 Claims, 8 Drawing Sheets

U.S. PATENT DOCUMENTS

| | | | |
|---|---|---|---|
| 4,996,292 | 2/1991 | Fox et al. | 528/328 |
| 5,057,597 | 10/1991 | Koskan | 528/328 |
| 5,116,513 | 5/1992 | Koskan et al. | 210/698 |
| 5,142,062 | 8/1992 | Knebel et al. | 548/545 |
| 5,152,902 | 10/1992 | Koskan et al. | 210/698 |
| 5,219,952 | 6/1993 | Koskan et al. | 525/419 |
| 5,221,733 | 6/1993 | Koskan et al. | 530/333 |
| 5,268,437 | 12/1993 | Holy et al. | 526/229 |
| 5,284,512 | 2/1994 | Koskan et al. | 106/416 |
| 5,288,783 | 2/1994 | Wood | 525/418 |
| 5,292,864 | 3/1994 | Wood et al. | 528/490 |
| 5,296,578 | 3/1994 | Koskan et al. | 528/363 |
| 5,319,145 | 6/1994 | Paik et al. | 528/328 |
| 5,328,631 | 7/1994 | Du Vosel et al. | 252/174.23 |
| 5,367,047 | 11/1994 | Wood | 528/363 |
| 5,393,868 | 2/1995 | Freeman et al. | 528/480 |

PROCESS FOR PREPARING POLYSUCCINIMIDE BY HIGH TEMPERATURE REACTION

CROSS-REFERENCES TO RELATED APPLICATIONS AND PATENTS

This application is a continuation-in-part of application Ser. No. 08/118,589 now abandoned, filed on Sep. 10, 1993, in the name of Louis L. Wood, which was a continuation-in-part of application Ser. No. 08/007,376, filed Jan. 21, 1993 (now U.S. Pat. No. 5,288,783) which was a continuation-in-part of application Ser. No. 07/882,919 filed on May 14, 1992 (now abandoned).

FIELD OF THE INVENTION

This invention relates to processes for the production of polysuccinimide, polyaspartic acid and salts of polyaspartic acid and uses for these materials.

DESCRIPTION OF RELATED ART

The salts of polyaspartic acid have been used for fertilizers, and scale inhibition agents. They are particularly useful for the prevention of scale deposition in boiler water, reverse osmosis membranes and in detergents. One of the primary characteristics that makes them valuable in this respect is the fact that they are readily biodegradable, whereas other materials that are presently used for this purpose are either slowly biodegradable, e.g. polyacrylic acid, or harmful to the environment, e.g. polyphosphoric acid.

Sodium polyaspartate was used in the prevention of boiler scale by changing the crystal structure of calcium salts resulting in the formation of a soft scale (Sarig et al., The use of polymers for retardation of scale formation. Natl Counc Res Dev [Rep] (1sr.), 150, 1977). Polyaspartic acid, molecular weight (MW) 6,000, was found to be superior to polyglutamate, MW 14,400, polyvinyl sulfonate, MW 5300, and polyacrylic acid, MW 6,000, in that it gave 66% retardation of total scale and 90% retardation of calcium sulfate scale. In addition, the scale formed in the presence of polyaspartate was softer than that produced in the presence of polyacrylate, polyglutamate and polyvinyl sulfonate.

U.S. Pat. No. 4,839,461 discloses a method for making polyaspartic acid from maleic acid and ammonia by reacting these constituents in a 1:1–1.5 molar ratio by raising the temperature to 120°–150° C. over a period of 4–6 hours and maintaining it for 0–2 hours. It is further disclosed that temperatures above 140°–160° C. result in elimination of $CO_2$, thus teaching degradation of the material. The molecular weight range obtained by this method was said to be 1,000–4,000 with a cluster at 1,800–2,000. That patent states that this material is useful in the prevention of tarnishing glass and porcelain articles. Although not stated in this patent, it is known that this action would occur as a result of the inhibition of calcium sulfate deposition. Harada, et al. (Thermal polycondensation of free amino acids with polyphosphoric acid. Origins Prebiol. systems Their Mol Matrices, Proc. Conf., Walkulla Springs, Fla., 289, 1963) obtained polyaspartic acid from aspartic acid and phosphoric acid at temperatures over 100° C. over a time period of 50–250 hrs, but required temperatures over 170° C. without phosphoric acid being present.

U.S. Pat. No. 5,057,597 discloses a method for the polycondensation of aspartic acid to produce polyaspartic acid by heating the aspartic acid in a fluidized bed reactor to 221° C. for a period of 3–6 hours in a nitrogen atmosphere followed by conventional alkaline hydrolysis.

Kovacs et al. (J. Org. Chem., 25 1084 [1961]) prepared polyaspartic acid by heating aspartic acid to 200° C. in vacuo for a period of 120 hours or in boiling tetralin over a period of 100 hours. Kovacs et al., showed that the intermediate formed in the thermal polymerization of aspartic acid was polysuccinimide.

Frankel et al. (J. Org. Chem., 16, 1513 [1951]) prepared polyaspartic acid by heating the benzyl ester of N-carboxyanhydroaspartic acid followed by saponification.

Dessaigne (Comp. rend. 31, 432–434 [1850]) prepared condensation products which gave aspartic acid on treatment with nitric or hydrochloric acid by dry distillation of the acid ammonium salts of malic, fumaric or maleic acid at unspecified times and temperatures.

U.S. Pat. No 3,846,380 discloses that polysuccinimide may be made by heat condensation of the following starting materials, aspartic acid; ammonium salts of aspartic acid, malic acid, maleic acid and fumaric acid; and mono- and diamides of aspartic acid, malic acid, maleic acid and fumaric acid.

U.S. Pat. No. 4,696,981 discloses the formation of anhydropolysuccinic acid by the microwave radiation of ammonium salts of malic acid via the formation of ammonium maleate.

Jpn. Kokai 60,203,636 [C.A. 104, 207690 m, 1986] discloses a method for the synthesis of copolymers of aspartic acid by heating amides, ammonium salts or monoamide-ammonium salts of malic acid, maleic acid or/and fumaric acid with one or more amino acids at 180° C. for four hours.

SUMMARY OF THE INVENTION

Polymers of aspartic acid which are suitable for the prevention of scale and as dispersants may be obtained by reacting maleic acid and ammonia in a molar ratio of 1:1–2.1 at 170°–350° C. and then converting the polysuccinimide formed to a salt of polyaspartic acid by hydrolysis with an alkaline earth or alkali metal hydroxide or with ammonium hydroxide. Alkaline earth and alkali metal hydroxides include magnesium, calcium, strontium, barium, lithium, sodium, and potassium hydroxides. The reaction is carried out by the addition of water to maleic anhydride, thus forming maleic acid, or to maleic acid followed by addition of the appropriate amount of ammonia in the form of gaseous ammonia or as its aqueous solution. This solution is then heated to remove water. A melt of the maleic acid and ammonia is formed and water removal continues as the reaction proceeds and the temperature is brought to 170°–350° C. When the theoretical quantity of water formed in the production of polysuccinimide has been removed, which may occur in less than 5 minutes, the reaction mixture is allowed to cool. The polysuccinimide formed can be used to make other useful products or can be hydrolyzed with metal hydroxides to provide the appropriate salt of polyaspartic acid. Solutions of the salts of polyaspartic acid formed in this manner have the same scale inhibition performance and molecular weight range as do the polymers formed by the thermal polymerization of aspartic acid itself. Further manipulation to remove the water of the salts can be carried out to provide water free powders of the salts or the free acid. Polymers of polyaspartic acid also may be formed in an analogous process by reacting fumaric acid and ammonia in a molar ratio of 1:1–2.1 at 200°–300° C. and then convening the polysuccinimide formed to a salt of polyaspartic acid by hydrolysis with an alkaline earth or alkali metal hydroxide or with ammonium hydroxide.

Polysuccinimide may also be formed by heating the mono- or diamide of a compound selected from the group consisting of malic acid, maleic acid and fumaric acid at 170° to 350° C.

In a preferred embodiment of the present invention, the initial reactant mixture is agitated during the reaction which forms the polysuccinimide. Although applicants do not wish to be bound by any theory, it is believed that the agitation of the reactant mixture (e.g., malic acid, maleic acid or fumaric acid and ammonia) results in a more homogenous reaction mixture during the reaction and helps to prevent buildup of the reactants or the reaction product (e.g., polysuccinimide) on the reactor walls, which can affect the rate of heat transfer from the exterior of the reactor to the reactant mixture and suppress or even prevent the formation of the proper reaction product. The agitation can be provided by any suitable means, for example, by stirring, shaking, vibrating, tumbling, etc. Moreover, this method is also preferred when the polysuccinimide is formed by heating the mono- or diamide of a compound selected from the group consisting of malic acid, maleic acid and fumaric acid at from about 170° to 350° C. For example, this method is preferred when the polysuccinimide is formed by heating the monoamide of maleic acid (i.e., maleamic acid) at from about 170° to 350° C.

In another preferred embodiment of the present invention, the initial reactant mixture that is used to form the polysuccinimide contains no organic solvents (i.e, the reaction is performed in the absence of an organic solvent).

Moreover, this method of forming the polysuccinimide in the absence of an organic solvent is also preferred when the polysuccinimide is formed by heating the mono- or diamide of a compound selected from the group consisting of malic acid, maleic acid and fumaric acid at from about 170° to 350° C. For example, this method is preferred when the polysuccinimide is formed by heating the monoamide of maleic acid (i.e., maleamic acid) at from about 170° to 350° C.

The polyaspartic acid provided by the present invention is suitable for inhibition of scale deposition, whereas the methods previously used to produce polyaspartic acid did not provide a polymer of sufficient molecular weight to prevent scale formation.

The object of this invention is to provide a means of preparing polysuccinimide. A further object of this invention is to provide a means of preparing polyaspartic acid or salts of polyaspartic acid.

DETAILED DESCRIPTION OF THE EMBODIMENTS

As opposed to the teachings of U.S. Pat. No. 4,839,461, I have found that, although the use of the polyaspartic acid made by the process is said to be useful in the prevention of hardness deposits, no actual experimentation to confirm this finding is reported. In fact, upon careful repetition of the procedures of U.S. Pat. No. 4,839,461, the results below clearly demonstrate that polymers of aspartic acid prepared by heating the ammonium salts of maleic acid at 140°–150° C. for 4 to 6 hours did not give a polymer that was active as a calcium scale inhibitor. Further, calculations of the theoretical weight of polysuccinimide (molecular weight 97) formed in Example 2 indicates that the reaction was not taken to completion under the conditions described.

EXAMPLE 1.

Thermal Polymerization of L-Aspartic Acid at 240°–250° C.

Aspartic acid, 133 g, was tumbled under nitrogen at 100 Torr, at 240°–250° C. for 1.5 hours to give a pink powder weighing 97.3 g. This solid was slurried in 200 ml of water at 25° C. and a solution of 40 g of water containing 40.0 g of sodium hydroxide was added over a period of 15 minutes with intermittent cooling to keep the temperature between 60° and 70° C. The resultant clear red-brown solution, pH 12.0, was adjusted to pH 7.0 by the addition of 1.5 g of citric acid and contained 25% solids.

The sodium polyaspartate was tested for inhibition of calcium carbonate precipitation by the calcium drift assay. In this assay a supersaturated solution of calcium carbonate is formed by adding 29.1 ml of 0.55M NaCl and 0.01M KCl to 0.15 ml of 1.0M $CaCl_2$ and 0.3 ml of 0.5M $NaHCO_3$. The reaction is initiated by adjusting the pH to 7.5–8.0 by titration with 1 N NaOH and addition of the material to be tested for inhibition of $CaCO_3$ precipitation at a level of 1.7 ppm. At three minutes, 10 mg of $CaCO_3$ is added and the pH is recorded. The decrease in pH is directly correlated to the amount of $CaCO_3$ that precipitates. The effectiveness of the inhibition is compared to that of sodium polyacrylate, used commercially for the purpose of preventing scale formation.

Figure 1:
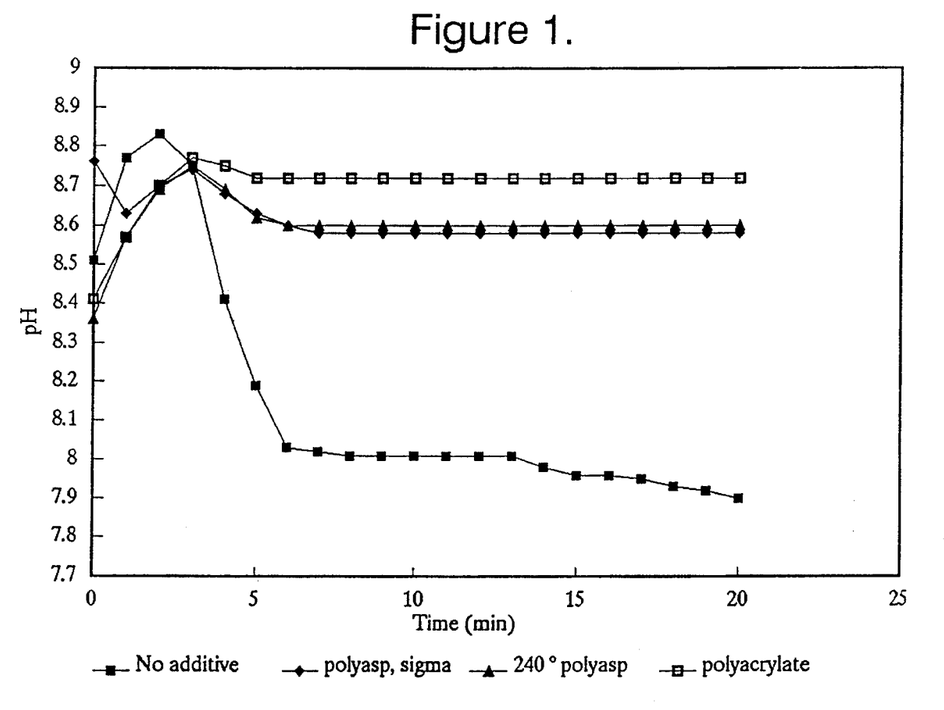
FIG. 1 shows the effect of additives on the inhibition of calcium carbonate precipitation.

FIG. 1 shows the effect of no additive in this test compared with polyacrylate, chemically synthesized L-α-polyaspartate and the polyaspartate prepared in this Example. Both thermally prepared and chemically synthesized polyaspartate were very close to polyacrylate by the calcium drift assay when all materials were tested at 1.7 ppm of additive.

EXAMPLE 2.

Thermal Polymerization of Mono-Ammonium Maleate at 145°–150° C.

Following the examples of U.S. Pat. No. 4,839,461, a slurry of 9.8 g (0.1 mole) maleic anhydride was dissolved in 20 ml water at 80°–95° C. and stirred for 30 minutes while allowing the mixture to cool to 25° C. To this colorless solution at 25° C. was added 13 g of 30% aqueous solution of ammonium hydroxide (0.11 mol NH₃) to give a colorless solution. This solution was boiled to dryness over a period of 30 minutes at approximately 100°–115° C. to give a white crystalline solid. The solid was tumbled under nitrogen at 100 Torr, at 145°–150° C. for 4 hours to give a water insoluble, pinkish-tan brittle glasslike solid weighing 11.4 g. This solid was dissolved in 26.2 g of an aqueous solution containing 1.36 g of sodium hydroxide to form a clear red-brown solution, pH 7.0, containing 25% solids.

Figure 2:
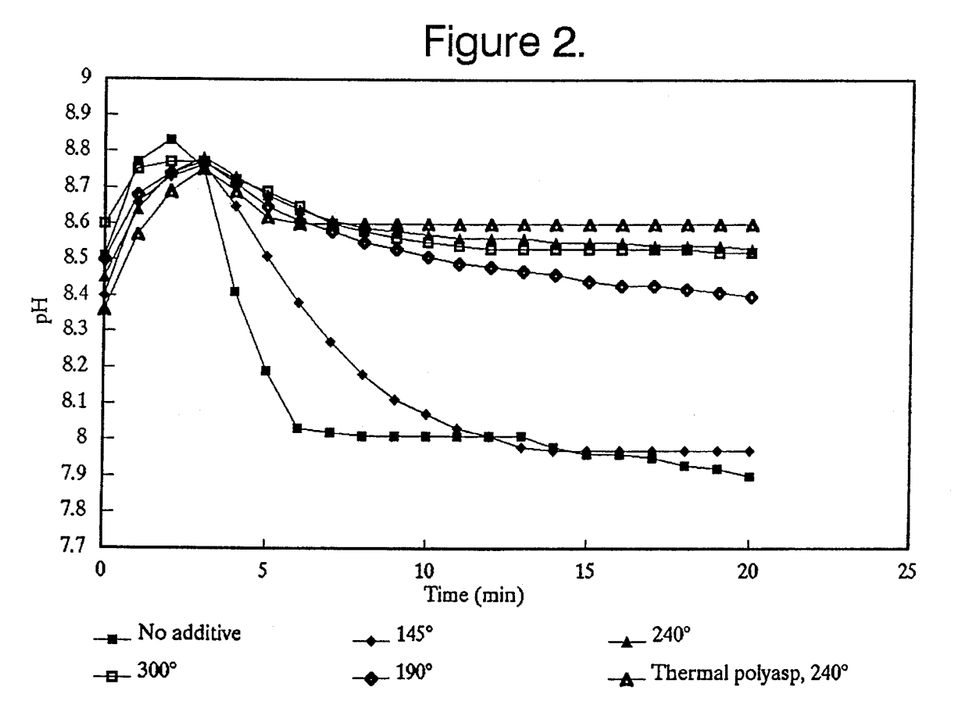
FIG. 2 shows the effect of thermally polymerized mono-ammonium maleate salts as calcium scale inhibitors.

FIG. 2 shows a plot of the data obtained in this example compared to that of the no additive assay and the thermally prepared polyaspartate. The material obtained at 145°–150° C. is no better than no additive when tested at 1.7 ppm.

EXAMPLE 3.

Thermal Polymerization of Mono-Ammonium Maleate at 190°–200° C.

A slurry of 9.8 g (0.1 mole) maleic anhydride was dissolved in 20 ml water at 80°–95° C. and stirred for 30 minutes while allowing the mixture to cool to 25° C. To this colorless solution at 25° C. was added 13 g of 30% aqueous solution of ammonium hydroxide (0.11 mol NH₃) to give a colorless solution. This solution was boiled to dryness over a period of 30 minutes at approximately 100°–115° C. to give a whim crystalline solid. The solid was tumbled under nitrogen at 100 Torr, at 190°–200° C. for 4 hours to give a water insoluble, pinkish-tan brittle glasslike solid weighing 10.6 g. This solid was dissolved in 35.4 g of an aqueous solution containing 1.9 g of sodium hydroxide to form a clear red-brown solution, pH 9.0, containing 25% solids.

FIG. 2 shows that polyaspartic acid of this example in the calcium drift assay of Example 1 at 1.7 ppm much improved compared to the material of Example 2.

EXAMPLE 4.

Thermal Polymerization of Mono-Ammonium Maleate at 240°–250° C.

A slurry of 9.8 g (0.1 mole) maleic anhydride was dissolved in 20 ml water at 80°–95° C. and stirred for 30 minutes while allowing the mixture to cool to 25° C. To this colorless solution at 25° C. was added 13 g of 30% aqueous solution of ammonium hydroxide (0.11 mol NH₃) to give a colorless solution. This solution was boiled to dryness over a period of 30 minutes at approximately 100°–115° C. to give a whim crystalline solid. The solid was tumbled under nitrogen at 100 Torr, at 240°–250° C. for 1.5 hours to give a water insoluble, pinkish-tan brittle glasslike solid weighing 9.6 g. This solid was dissolved in 36.0 g of an aqueous solution containing 4.0 g of sodium hydroxide to form a clear red-brown solution, pH 12.0. To this solution was added 0.25 g citric acid to adjust the pH to 8.5 and the resultant solution contained 25% solids.

FIG. 2 shows that the polyaspartic acid of this example in the calcium drift assay of Example 1 at 1.7 ppm was equivalent to that of thermally prepared polyaspartate.

EXAMPLE 5.

Thermal Polymerization of Mono-Ammonium Maleate at 300° C.

A slurry of 9.8 g (0.1 mole) maleic anhydride was dissolved in 20 ml water at 80°–95° C. and stirred for 30 minutes while allowing the mixture to cool to 25° C. To this colorless solution at 25° C. was added 13 g of 30% aqueous solution of ammonium hydroxide (0.11 mol NH₃) to give a colorless solution. This solution was boiled to dryness over a period of 30 minutes at approximately 100°–115° C. to give a white crystalline solid. The solid was tumbled at 300° C. for 5 minutes to give a water insoluble, brick-red brittle glasslike solid weighing 9.6 g. This solid was dissolved in 40.0 g of an aqueous solution containing 3.8 g of sodium hydroxide to form a clear red-brown solution, pH 9.0, containing 25% solids.

FIG. 2 shows that the polyaspartic acid of this example in the calcium drift assay of Example 1 at 1.7 ppm was equivalent to that of thermally prepared polyaspartate.

In summary, polyaspartic acid prepared at 145°–150° C. from maleic anhydride and ammonia was ineffective as a scale inhibitor which that prepared at 190°–200° C. was nearly as effective as thermal polyaspartate and that prepared at 240° to 300° C. was equivalent to thermal polyaspartate as a scale inhibitor. The time required for polymerization was reduced from 4–8 hours to between 5 minutes and 1.5 hours, thus providing a significant improvement in the economy of industrial production.

EXAMPLE 6.

Thermal Polymerization of Mono-Ammonium Fumarate at 145°–150° C.

Following the examples of U.S. Pat. No. 4,839,461, a slurry of 11.6 g (0.1 mole) fumaric acid was dissolved in 30 ml water was mixed with 13 g of 30% aqueous solution of ammonium hydroxide (0.11 mol NH₃). Carefully warming the slurry to boiling gave a clear solution. This solution was boiled to dryness over a period of 15 minutes to give a white crystalline solid. The solid was tumbled under nitrogen at 100 Torr, at 145°–150° C. for 8 hours to give an off-white glasslike solid weighing 13.2 g. This solid was dissolved in 40 g of an aqueous solution containing 4.0 g of sodium hydroxide to form a pale yellow solution, pH 8.5, containing 25% solids.

Figure 3:
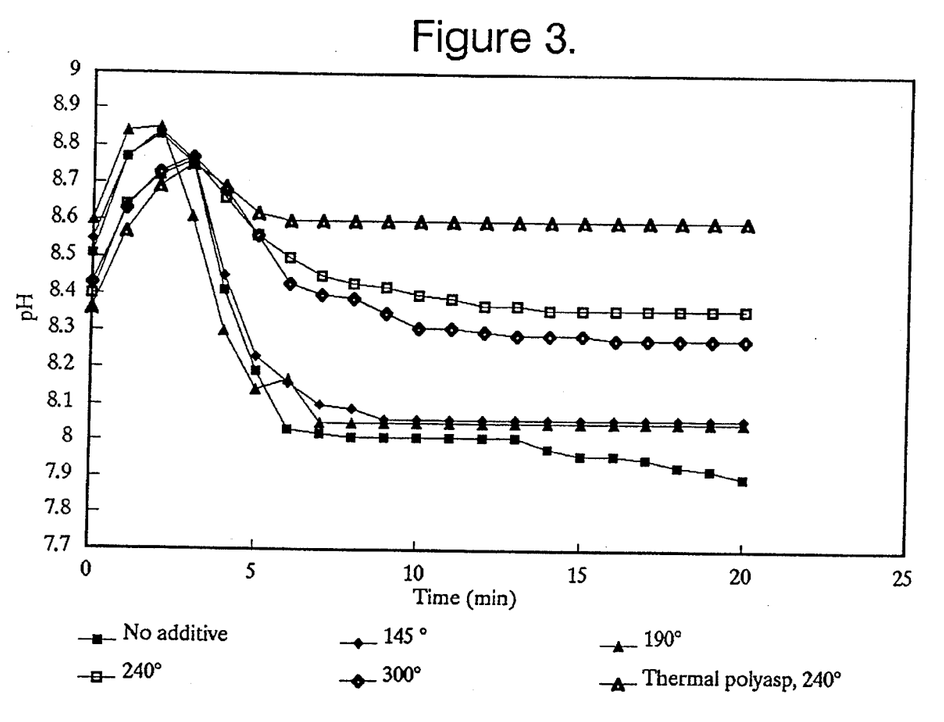
FIG. 3 shows the effect of thermally polymerized mono-ammonium fumarate salts as calcium scale inhibitors.

FIG. 3 shows a plot of the data obtained in the calcium drift assay on the material obtained in this example. The material was only slightly better than no additive when tested at 1.7 ppm.

EXAMPLE 7.

Thermal Polymerization of Mono-Ammonium Fumarate at 190°–200° C.

A slurry of 11.6 g (0.1 mole) fumaric acid was dissolved in 30 ml water was mixed with 13 g of 30% aqueous solution of ammonium hydroxide (0.11 mol NH₃). Carefully warming the slurry to boiling gave a clear solution. This solution was boiled to dryness over a period of 15 minutes to give a white crystalline solid. The solid was tumbled under nitrogen at 100 Torr, at 190°–200° C. for 4 hours to give a water insoluble, tan glasslike solid weighing 12.0 g. This solid was dissolved in 40 g of an aqueous solution containing 4.0 g of sodium hydroxide to form a pale yellow solution, pH 7.0, containing 25% solids.

FIG. 3 shows a plot of the data obtained in the calcium drift assay on the material obtained in this example. The material was only slightly better than no additive when tested at 1.7 ppm.

EXAMPLE 8.

Thermal Polymerization of Mono-Ammonium Fumarate at 240°–250° C.

A slurry of 11.6 g (0.1 mole) fumaric acid was dissolved in 30 ml water was mixed with 13 g of 30% aqueous solution of ammonium hydroxide (0.11 mol NH₃). Carefully warming the slurry to boiling gave a clear solution. This solution was boiled to dryness over a period of 15 minutes to give a white crystalline solid. The solid was tumbled under nitrogen at 100 Torr, at 240°–250° C. for 1.5 hours to give a water insoluble, dark brown glasslike solid weighing 9.3 g. This solid was dissolved in 40 g of an aqueous solution containing 4.0 g of sodium hydroxide to form a clear brown solution, pH 8.0, containing 25% solids.

FIG. 3 shows a plot of the data obtained in the calcium drift assay on the material obtained in this example. The material was much better than that prepared in Example 6 when tested at 1.7 ppm.

EXAMPLE 9.

Thermal Polymerization of Mono-Ammonium Fumarate at 300° C.

A slurry of 11.6 g (0.1 mole) fumaric acid was dissolved in 30 ml water was mixed with 13 g of 30% aqueous solution of ammonium hydroxide (0.11 mol $NH_3$). Carefully warming the slurry to boiling gave a clear solution. This solution was boiled to dryness over a period of 15 minutes to give a white crystalline solid. The solid was tumbled at 300° C. for 5 minutes to give a water insoluble, dark brown glasslike solid weighing 9.8 g. This solid was dissolved in 40 g of an aqueous solution containing 3.8 g of sodium hydroxide to form a clear brown solution, pH 9.0, containing 25% solids.

FIG. 3 shows a plot of the data obtained in the calcium drift assay on the material obtained in this example. The material was much better than that prepared in Example 6 when tested at 1.7 ppm.

In summary, thermally polymerized mono-ammonium fumarate provided polyaspartate prepared at 145°–150° C. and at 190°–200° C. which was only slightly active in scale inhibition while that prepared at 240° C. and at 300° C. were active but less active than thermal polyaspartate as scale inhibitors.

EXAMPLE 10.

Thermal polymerization of Di-Ammonium Maleate at 135°–140° C.

Following the examples of U.S. Pat. No. 4,839,461, a solution of 1.96 g (0.02 mole) maleic anhydride was dissolved in 1 ml water at 50°–60° C. and stirred for 30 minutes while allowing the mixture to cool to 25° C. To this colorless solution at 25° C. was added 2.4 g of 30% aqueous solution of ammonium hydroxide (0.022 mol $NH_3$) to give a colorless solution. This solution was boiled to dryness over a period of 30 minutes at approximately 100°–120° C. and 10–20 Torr, to give a white crystalline solid. The solid was tumbled under nitrogen at 100 Torr, at 135°–140° C. for 8 hours to give a water insoluble, pinkish-tan brittle glasslike solid weighing 2.7 g. This solid was dissolved in 6.6 g of an aqueous solution containing 0.8 g of sodium hydroxide to form a clear orange solution, pH 7.0, containing 25% solids.

Figure 4:
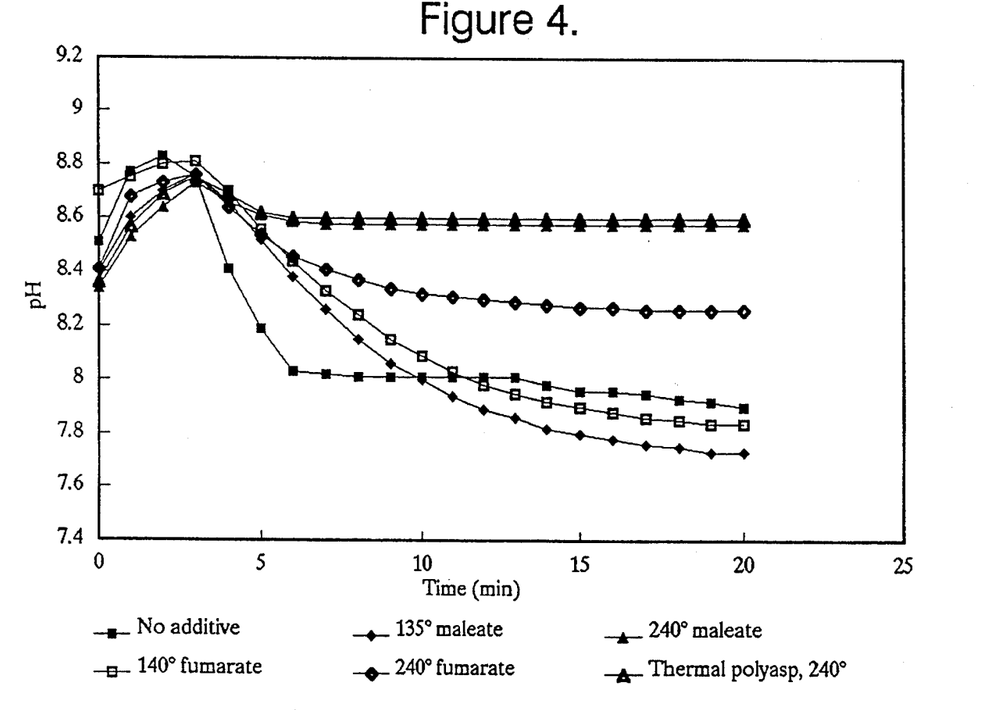
FIG. 4 shows the effect of thermally polymerized di-ammonium fumarate and maleate salts as calcium scale inhibitors.

FIG. 4 shows a plot of the data obtained in this example compared to that of the no additive assay and the thermally prepared polyaspartate. The material obtained at 135°–145° C. is not as good as no additive when tested at 1.7 ppm.

EXAMPLE 11.

Thermal Polymerization of Di-Ammonium Maleate at 240°–250° C.

A solution of 9.8 g (0.1 mole) maleic anhydride was dissolved in 20 ml water at 50°–60° C. and stirred for 30 minutes while allowing the mixture to cool to 25° C. To this colorless solution at 25° C. was added 26 g of 30% aqueous solution of ammonium hydroxide (0.22 mol $NH_3$) to give a colorless solution. This solution was boiled to dryness over a period of 30 minutes at approximately 100°–120° C. and 10–20 Torr, to give a white crystalline solid. The solid was tumbled under nitrogen at 100 Torr, at 240°–250° C. for 1.5 hours to give a water insoluble, red-brown brittle glasslike solid weighing 9.4 g. This solid was dissolved in 40 g of an aqueous solution containing 3.8 g of sodium hydroxide to form a clear red-brown solution, pH 7.0, containing 25% solids.

FIG. 4 shows a plot of the data obtained in this example compared to that of the no additive assay and the thermally prepared polyaspartate. The material of this example is equivalent to that of thermal polyaspartate when tested at 1.7 ppm.

EXAMPLE 12.

Thermal Polymerization of Di-Ammonium Fumarate at 140°–150° C.

A slurry of 11.6 g (0.1 mol) fumaric acid was dissolved in 30 ml water was mixed with 26 g of 30% aqueous solution of ammonium hydroxide (0.22 mol $NH_3$). Carefully warming the slurry to boiling gave a clear solution. This solution was boiled to dryness over a period of 15 minutes to give a white crystalline solid. The solid was tumbled under nitrogen at 100 Torr, at 140°–150° C. for 8 hours to give a water insoluble, brown, glasslike solid weighing 14 g. This solid was dissolved in 100 g of an aqueous solution containing 2.0 g of sodium hydroxide to form a pale yellow solution, pH 7.0, containing 25% solids.

FIG. 4 shows a plot of the data obtained in the calcium drift assay on the material obtained in this example. The material was only slightly better than no additive when tested at 1.7 ppm.

EXAMPLE 13.

Thermal Polymerization of Di-Ammonium Fumarate at 235°–245° C.

A slurry of 11.6 g (0.1 mol) fumaric acid was dissolved in 30 ml water was mixed with 26 g of 30% aqueous solution of ammonium hydroxide (0.22 mol $NH_3$). Carefully warming the slurry to boiling gave a clear solution. This solution was boiled to dryness over a period of 15 minutes to give a white crystalline solid. The solid was tumbled under nitrogen at 100 Torr, at 235°–245° C. for 1.5 hours to give a water insoluble, brown, glasslike solid weighing 9.0 g. This solid was dissolved in 100 g of an aqueous solution containing 200 g of sodium hydroxide to form a pale yellow solution, pH 8.5, containing 25% solids.

FIG. 4 shows a plot of the data obtained in the calcium drift assay on the material obtained in this example. The material was only slightly better than no additive when tested at 1.7 ppm.

EXAMPLE 14.

Molecular weight analysis of polyaspartate prepared in various ways.

Molecular weight determination of the materials prepared in the foregoing examples and commercially available materials was made by chromatography on a 1 cm×18 cm, Sephadex G-50 column in a mobile phase of 0.02M sodium phosphate buffer, pH 7.0, running at 0.5 ml/min, with detection in the UV at 240 nm. The sample size ranged from 0.01 to 0.5 mg/ml.

Figure 5:
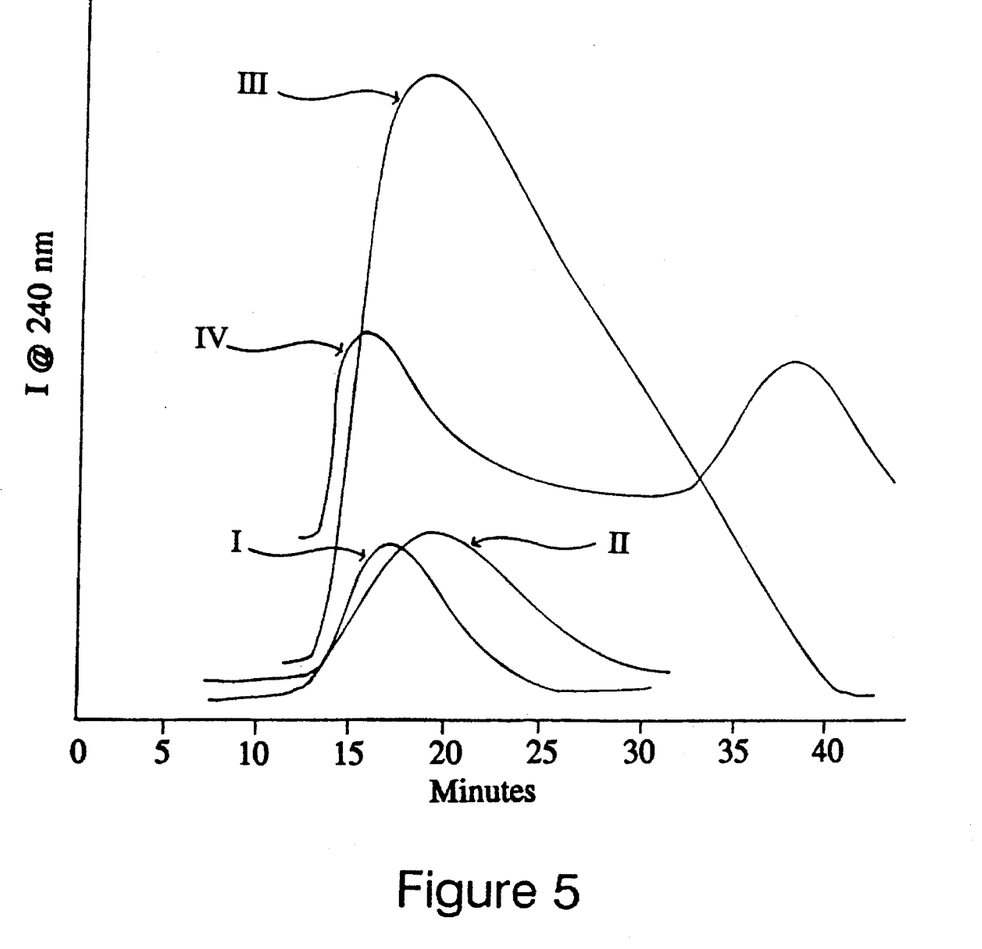
FIG. 5 shows the calibration of a molecular weight column.

FIG. 5 shows the results of sodium polyaspartate, 13,000 m.w., from Sigma, I; sodium polyaspartate, 7,500 m.w., from Sigma, II; and sodium polyaspartate, Example 1, III, m.w. 5,000. IV is a commercial blend of sodium acrylate m.w. 15,000 and 2,000.

Figure 6:
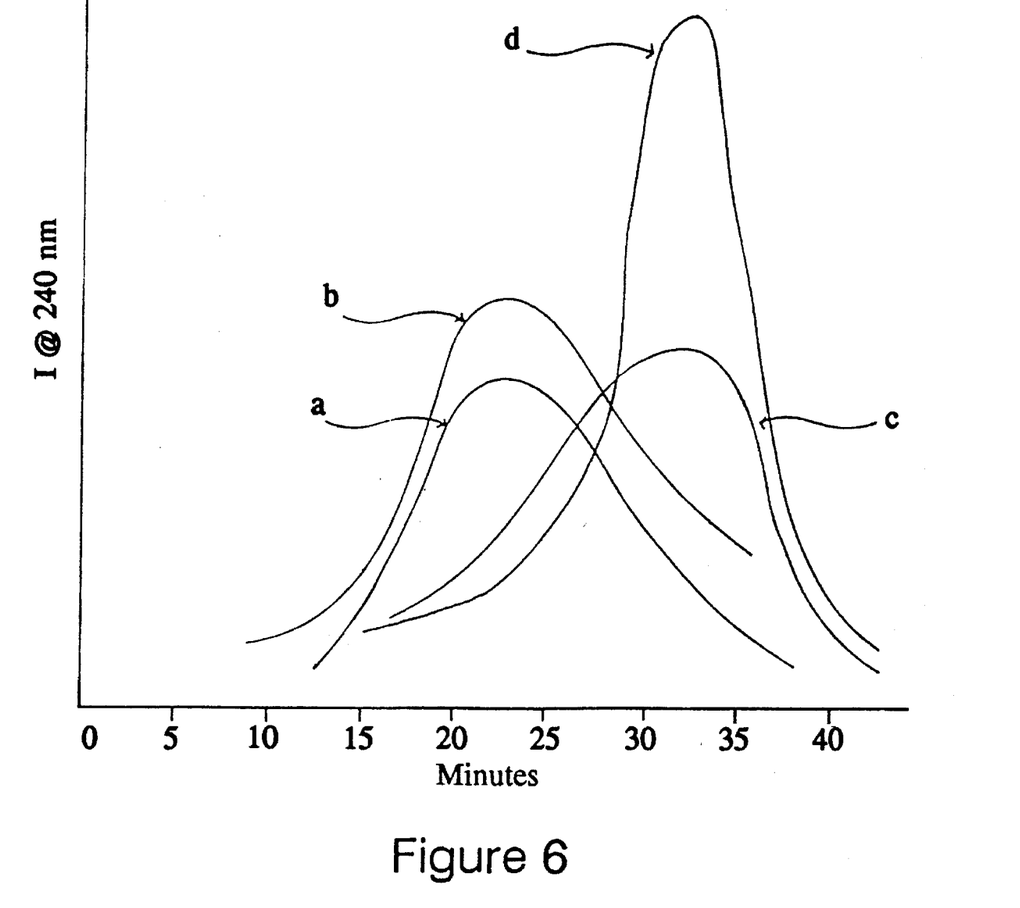
FIG. 6 shows the molecular weight determination of polymers formed in Examples 2, 4, 10, and 11.

FIG. 6 shows the result of Example 4 as "a"; Example 11 as "b"; Example 2 as "c" and Example 10 as "d". With maleic acid and ammonia reactions, temperatures of 240° C. gave molecular weights over a broad range centered at 7,000–8,000 while temperatures of 135°–150° C. gave molecular weights over a broad range centered at 2,000.

Figure 7:
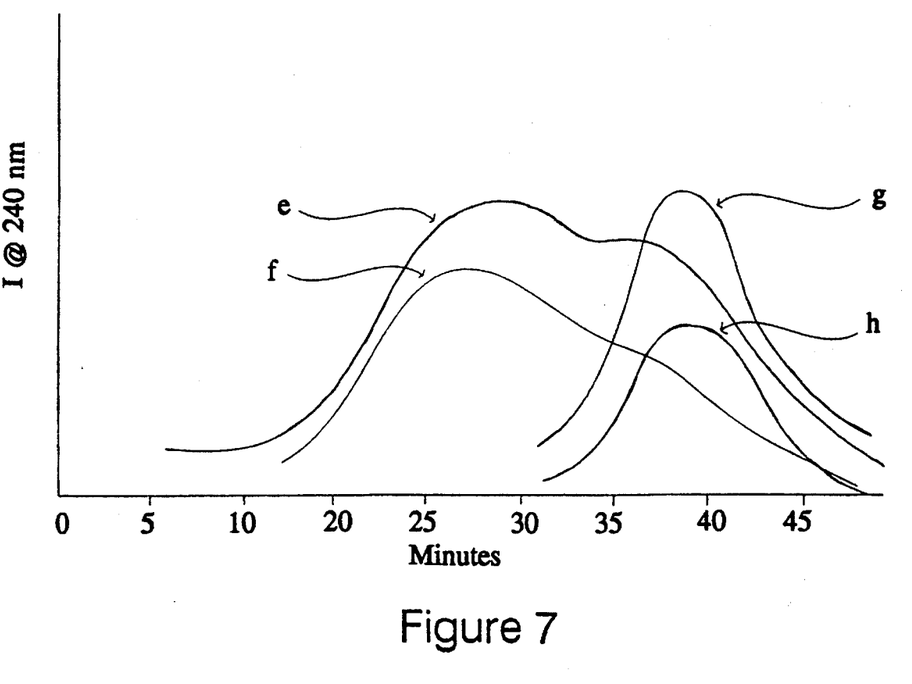
FIG. 7 shows the molecular weight determination of polymers formed in Examples 6, 8, 12, and 13.

FIG. 7 shows the result of Example 8 as "e"; Example 13 as "f"; Example 6 as "g" and Example 12 as "h". With fumaric acid and ammonia reactions, temperatures of 240° C. gave molecular weights over a broad range centered at 7,000–8,000 while temperatures of 140°–150 ° C. gave molecular weights over a broad range centered at 2,000.

Figure 8:
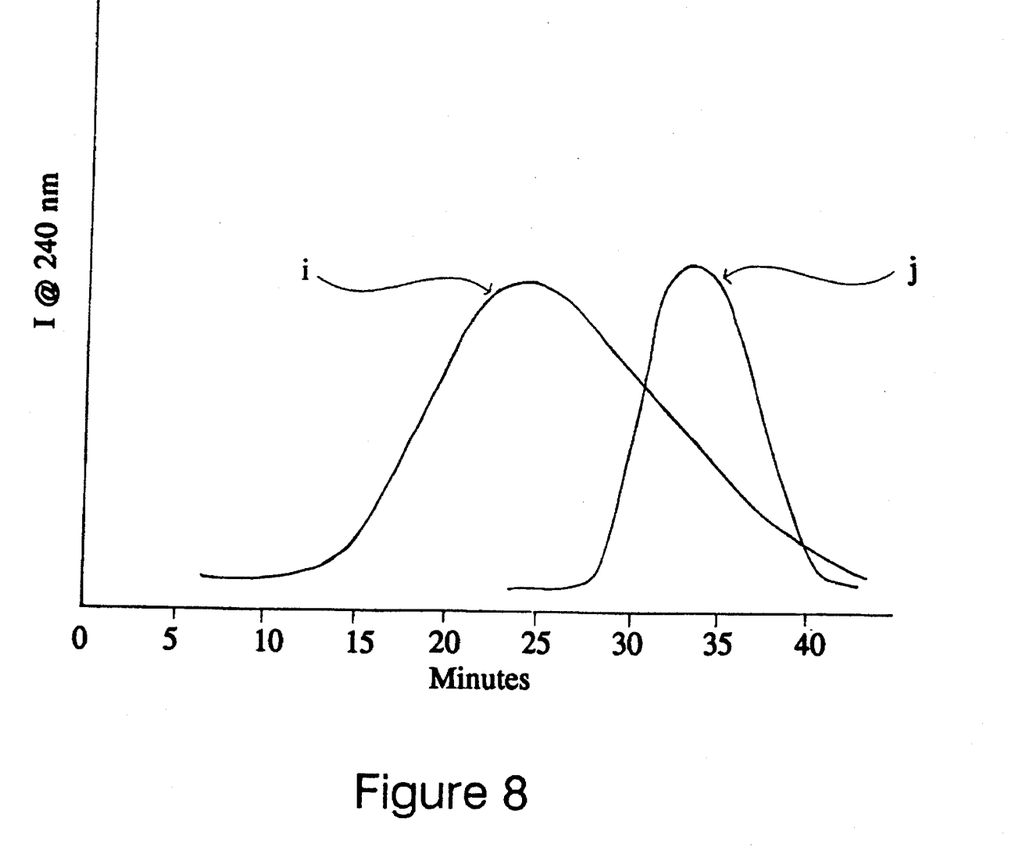
FIG. 8 shows the molecular weight determination of polymers formed in Examples 3 and 7.

FIG. 8 shows the result of Example 3 as "T"; Example 7 as "j". Temperatures of 190°–200° C. gave molecular weights for maleate over a broad range centered at 7,000–8,000 while temperatures of 190°–200° C. for fumarate gave molecular weights over a broad range centered at 2,000.

EXAMPLE 15.

Continuous production of polyaspartic acid.

A ZE25 twin screw extruder made by Berstorff, Charlotte, N.C., was set up with six barrel sections and the first two were held at 160° C. and the last four at 200° C. A 70% solution of monoammonium maleate in water was fed into the extruder which was turning at 100 RPM at a rate of 4 lbs/hr. The calculated residence time of the ammonium maleate/polysuccinimide at this rate is approximately 45 seconds. The product was then hydrolyzed with sodium hydroxide as in Example 5. The resulting product was tested for activity in the $CaSO_4$ assay. The sodium polyaspartate gave a precipitate of 30 mg and the blank control gave a precipitate of 80 mg. The molecular weight analysis gave a broad peak with a maximum at 23 minutes.

EXAMPLE 16.

Evaluation of different temperatures and time for production of polysuccinimide and polyaspartate.

Following the procedure of Example 3, various times and temperatures were evaluated for production of polysuccinimide, following which the polysuccinimide was hydrolyzed to polyaspartate as also carded out in Example 3. Samples 4a–4g were run in 20 minute segments with the results as shown. The results are given in Table 1.

TABLE 1

| Sample | Temp °C. | Time (hrs) | Kaolin[a] (mm) | $CaSO_4$[b] (mg ppt) 2.5 ppm | $CaSO_4$[b] (mg ppt) 1.25 ppm | $CaPO_n$[c] (min) | $CaCO_3$[d] ΔpH | Yield g/mol | PSS[e] (%) | GPC[f] (min) | $H_2O$ Sol[g] |
|---|---|---|---|---|---|---|---|---|---|---|---|
| blank |  |  | 0 | 84 | 84 | 21 | 1.10 |  |  |  |  |
| 1 | 135–140 | 8 | 0 | 12 | 68 | 26 | 1.04 | 110 | 28 | 31 | yes |
| 2 | 140–150 | 4.25 | 48 | 1 | 36 | 37 | 0.87 | 104 | 61 | 26 | no |
| 3 | 140–150 | 3.98 | 47 | 10 | 39 |  |  | 104.5 | 58 | 26.5 | no |
| 4a | 170–175 | .33 |  |  |  |  |  | 107.3 | 43 |  |  |
| 4b | 170–175 | .67 |  |  |  |  |  | 103.0 | 67 |  |  |
| 4c | 170–175 | 1 | 47 | 0 | 47 | 32 | 0.89 | 100 | 83 | 27 | no |
| 4d | 170–175 | 1.33 |  |  |  |  |  | 98.0 | 95 |  |  |
| 4e | 170–175 | 1.67 |  |  |  |  |  | 97.5 | 97 |  |  |
| 4f | 170–175 | 2 |  |  |  |  |  | 97 | 100 |  |  |
| 4g | 170–175 | 2.33 | 47 | 8 | 41 |  |  | 100 | 24 |  | no |
| 5 | 185–195 | 1 | 48 | 0 | 34 | 35 | 0.78 | 97.8 | 96 | 23 | no |
| 6 | 235–245 | 0.5 | 49 | 0 | 52 | 42 | 0.80 | 96.8 | 100 | 23 | no |
| 7 | 240 | .004 |  |  |  |  |  |  |  |  |  |

[a]Kaolin dispersion was run by placing the sample (20 ppm) in a 12 × 100 mm test tube containing 5 ml of deionized water containing 20 ppm of the sample to be tested and adding 40,000 ppm kaolin clay. The height of the suspended solids was measured and compared to a control in which no dispersant had been added. A higher value indicates better dispersancy.
[b]Precipitation assay for calcium sulfate. The material to be tested as an inhibitor of scale formation was added in appropriate quantities to a solution of 5 ml of calcium chloride solutions (21.6 g/L of $CaCl_2$ dihydrate and 41.4 g/L of NaCl) and 5 ml of sulfate solution (20.9 g/L of $Na_2SO_4$ and 41.4 g NaCl). The mixture was then placed in an oven at 160° F. for 12 hours. Finally the mixture was filtered through #2 filter paper and dried at 160° F. for 8 hours, after which the weight of precipitate was determined.
[c]pH dirft assay for calcium phosphate. A solution was is supersaturated with calcium phosphate was prepared by adding 0.1 ml of previously prepared aqueous solutions of 1.32 M $CaCl_2$ dihydrate and 0.90 M $NaH_2PO_4$ to 29.8 ml of distilled water, resulting in 4.4 mM $Ca^{2+}$ and 3.0 mM dissolved inorganic phosphorus. The reaction vessel is maintained at 25° C. There is considerable irregularity in the time necessary to begin precipitation. Calcium phosphate begins to crystallize within a few minutes of initiation (first drop in pH) and is transformed to hydroxyapatite, $Ca_{10}(PO_4)_6(OH)_2$, with a consequent downward pH drift (secnd drop in pH). The reaction ceases when the reactants are depleted and the pH ceases its downward drift.
[d]The $CaCO_3$ assay of Example 1 was used.
[e]Polysuccinimide formation as determined by weight of water lost.
[f]GPC (gel permeation chromatography) was carried out by the method of Example 14.
[g]Water solubility was determined by placing approximately 200 mg of sample into 2 ml of water at 80°–90° C. and observing for 15 min.

EXAMPLE 17.

Production of polyaspartate at low reaction times.

A slurry of 98 g (1 mol) of maleic anhydride was dissolved in 100 ml water and stirred for 5 min allowing the mixture to cool to 25° C. To this solution was added 117 g of 30% aqueous ammonium hydroxide (1 mol $NH_3$). This solution was taken to dryness over a period of 5 minutes at 100°–150° C. to give a light pink solid. Various portions of the solid were reacted at various times and temperatures by placing the sample on a Teflon surface and heating with an electrically heated oven, to give water insoluble, pinkish-tan brittle solids and yields as shown in Table 2. The solids were dissolved in 1 equivalent of an aqueous solution of sodium hydroxide to form a clear red-brown solution.

TABLE 2

| Sample wt (g) | Area in² | Temp °C. | Time (min) | Yield (g) | Theoretical Yield (g) | CaSO₄ᵇ (mg ppt) ppm of sample added | | | GPCᶜ (min) |
|---|---|---|---|---|---|---|---|---|---|
| | | | | | | 0 | 2.5 | 5.0 | |
| blank | | | | | | 80 | | | |
| 1 | 0.56 | 290–302 | 3 | 0.65 | 0.68 | | 5 | 0 | 24 |
| 2.8 | 0.75 | 247–252 | 4 | 1.9 | 1.89 | | 69 | 0 | 24 |
| 4.2 | | 200 | 5 | 3.6 | 2.8 | | 73 | 38 | 29 |

EXAMPLE 18.

The production of polysuccinimide and polyaspartate from maleic anhydride and ammonia.

Ammonia was added to maleic anhydride to give maleamic acid. Maleamic acid, 11.5 g (0.1 moles), was tumbled at 148°–151° C. for 4 hr to give 9.7 g of red tan solids which were soluble in water. The solids were hydrolyzed with 1 equivalent of aqueous NaOH and tested. The results are given in Table 3.

A second portion of maleamic acid, 11.5 g (0.1 moles) was tumbled at 240°–250° C. for 1.5 hours to give 9.7 g of red tan solids which were insoluble in water, meeting the criteria for polysuccinimide.

A third portion of maleamic acid, 3.2 g (0.02 moles) was added to 2.3 g of 30% NH₄OH (0.02 moles NH₃) and tumbled at 300°–310° C. for 15 min to give 1.7 g of water insoluble red-brown solids.

Each of these samples was dissolved in 10 ml H₂O containing an equivalent amount of NaOH to give sodium polyaspartate.

TABLE 3

| Sample | Temp °C. | Time (hr) | CaCO₃ ΔpH |
|---|---|---|---|
| blank | | | 1.04 |
| 1 | 148–151 | 4 | 0.38 |
| 2 | 240–250 | 1.5 | .31 |
| 3 | 300 | 0.25 | .91 |

We claim:

1. A process for the preparation of polysuccinimide comprising either:
   a) heating the mono- or diamide of a compound selected from the group consisting of malic acid, maleic acid and fumaric acid; or
   b) heating a compound selected from the group consisting of malic acid, maleic acid and fumaric acid with ammonia, in a molar ratio of 1:1–2.1; at 170°–300° C. for four hours or less.

2. The process according to claim 1, wherein the temperature is 190°–280° C.

3. The process according to claim 1, wherein the compound is malic acid.

4. The process according to claim 1, wherein the compound is maleic acid.

5. The process according to claim 1, wherein the compound is fumaric acid.

6. The process according to claim 1, wherein the compound is monoamide of malic acid.

7. The process according to claim 1, wherein the compound is the monoamide of maleic acid.

8. The process according to claim 1, wherein the compound is the monoamide of fumaric acid.

9. The process according to claim 1, wherein the compound is the diamide of maleic acid.

10. The process according to claim 1, wherein the compound is diamide of fumaric acid.

11. A process for the preparation of polysuccinimide consisting essentially of heating a compound selected from the group consisting of malic acid, maleic acid and fumaric acid with ammonia, in a molar ratio of 1:1–2.1, at 170° to 350° C.

12. A process for the preparation of polysuccinimide comprising heating the mono- or diamide of a compound selected from the group consisting of malic acid, maleic acid and fumaric acid at 170° to 350° C.

13. A process for the preparation of polysuccinimide comprising heating maleamic acid at 170° to 350° C. with agitation.

14. A process according to claim 13, wherein said agitation is performed by at least one method selected from the group consisting of mixing, stirring, shaking, vibrating or tumbling.

15. A process for the preparation of polysuccinimide comprising heating the mono- or diamide of a compound selected from the group consisting of malic acid, maleic acid and fumaric acid at 140°–350° C. for four hours or less.

16. The process according to claim 15, wherein the temperature is 170°–300° C.

17. A process for the preparation of polysuccinimide comprising heating the monoamide or diamide of a compound selected from the group consisting of malic acid, maleic acid and fumaric acid at 170° C. to 350° C. with agitation.

18. The process of claim 12, wherein the heating step at 170° to 350° C. lasts for four hours or less.

19. A process for the preparation of polysuccinimide comprising:
   a) heating a compound selected from the group consisting of malic acid, maleic acid and fumaric acid with ammonia, in a molar ratio of 1:1–2.1, and water to remove at least a portion of the water and form a melt of the compound and ammonia;
   b) heating the melt to 170° to 350° C. for four hours or less; and
   c) removing any water formed while the melt is heated at 170° to 350° C. in step b).

20. The process of claim 13, wherein both ammonia and said maleamic acid are present during said heating step.

* * * * *